Patented Oct. 13, 1953

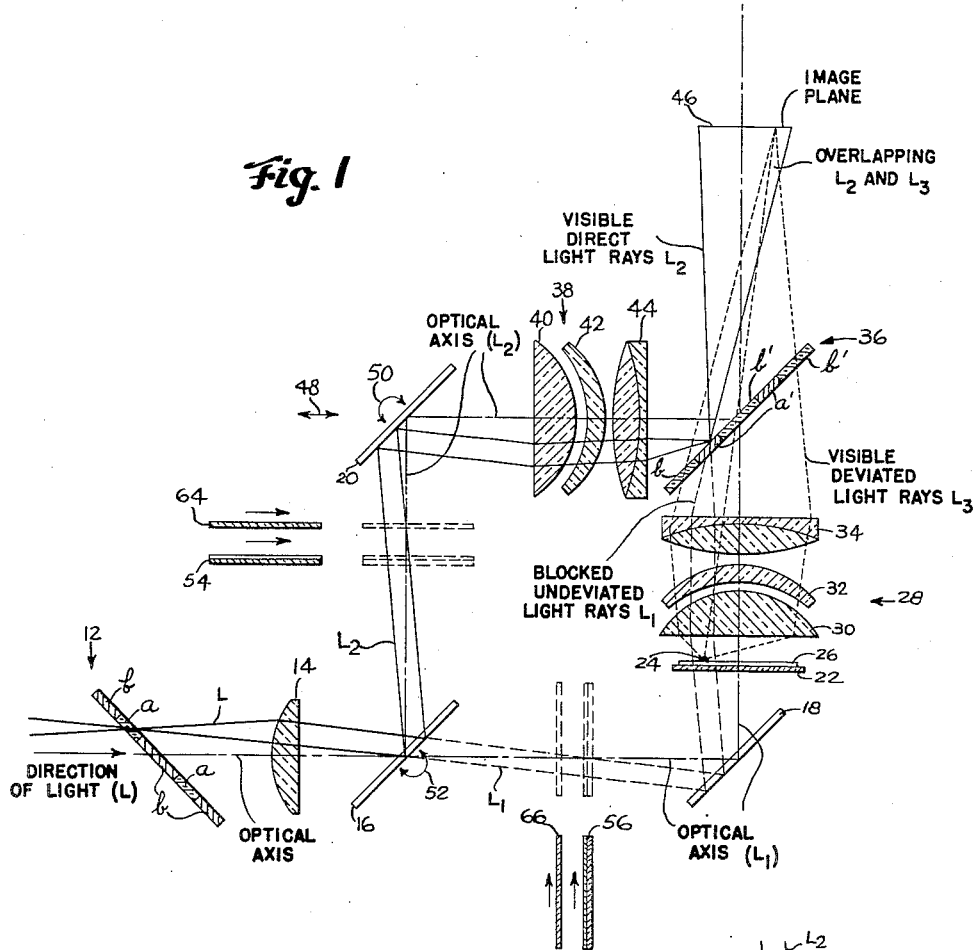
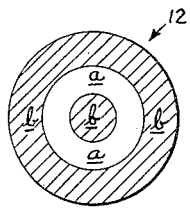
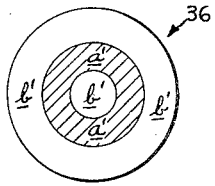
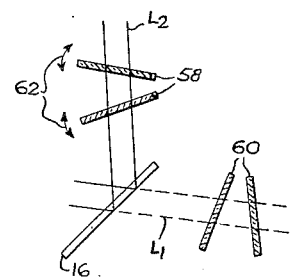

2,655,077

UNITED STATES PATENT OFFICE 2,655,077

MICROSCOPE WITH MEANS FOR MODIFYING CONTRAST IN OPTICAL IMAGES

Alva H. Bennett, Kenmore, N. Y., assignor to American Optical Company, Southbridge, Mass., a voluntary association of Massachusetts Application February 8, 1949, Serial No. 75,154

12 Claims. (Cl. 88—39)

This invention relates to modification of light rays within an optical system to obtain gradual alteration of contrast effects in the image of an object under observation. More particularly, the invention relates to an optical system such as, for example, a microscope which is adapted to the viewing of specimens wherein differences of optical path and light transmission exist which are not clearly perceptible through usual microscope means.

An object or specimen of the type considered herein may generally be said to constitute a plurality of particles and surrounding regions, a given particle and the surround associated therewith having, for example, a small difference of optical path (thickness times refractive index) or a small transmission difference. For clarity of explanation, a single particle and its surround and the relation of light directed thereupon and emerging therefrom will be considered.

In what may be termed "phase contrast microscopy," the usual practice is to employ a specially formed diaphragm, positioned adjacent the front focal plane of a condenser, for admitting light of a predetermined contour to the condenser. The latter directs the light upon the specimen and an objective and eyepiece are employed in a conventional manner. A special light-modifying element is positioned at the back focal plane of the objective, as established in cooperation with the condenser, for selectively altering the phase or amplitude of light rays intercepted thereby. Some of the light rays incident the particle are deviated (diffracted) thereby due to discontinuity of optical path at the edge of the particle and constitute higher orders of spectra. Other of the light rays incident the particle are undeviated by the latter and constitute the zero order of spectra. Still other rays which are directed upon the surround are also substantially undeviated. The undeviated rays emanating both from the particle and the surround are spread throughout a visible image plane such as the field of an eyepiece. The deviated rays or spectra emanating from the particle, which may be retarded thereby with respect to the undeviated rays, are brought to a focus on a part of the eyepiece field and are combined with overlapping portions of the undeviated rays to form a geometrical image of the particle. During their passage through the aforesaid light-modifying element, the latter accomplishes selective retardation of the undeviated (or deviated) rays so that the combined or interfering rays forming the image of the particle reinforce or destroy one another, according to the phase alteration performed, to provide, respectively, bright or dark contrast relative to the undeviated substantially noninterfering rays representing the surround. Or the light-modifying element provides selective absorption of the undeviated or deviated rays to effect amplitude changes therebetween and resultant alteration of contrast in the image.

The present invention is concerned, in general, with the above-described problem of selectively modifying the phase and amplitude of spectra to provide changes in contrast effects in an image of the specimen. However, a novel approach to the control of light rays employed for the purpose and improved means for gradually effecting such modification throughout a predetermined range are inherent in the invention. Certain disadvantages have obtained in former methods of employing the deviated and undeviated spectra in the manner described above. For example, undeviated light rays transmitted by the particle and surround are affected by said regions to some degree in amplitude and phase and the amount by which the light from these regions is altered may require special consideration, particularly as it may vary with different specimens. Moreover, other devices for obtaining a gradual modification of phase or amplitude have involved the placement of modifying zones for the deviated and undeviated light rays in such close proximity that it has been difficult to alter one without affecting the other and impairing the quality of an image. The present invention avoids functional employment of the undeviated spectra transmitted both by the particle and by the surround entirely, thus eliminating the aforesaid attendant disadvantages. Instead, direct rays from a light source are utilized in place of the undeviated spectra passing through the particle and surround. Moreover, the provision of distinct and widely separated optical paths or arms of the instrument for the deviated and direct light rays, respectively, permits their individual modification more easily and completely.

The term "light," as used herein, is not necessarily restricted to those wave lengths of radiant energy to which the human eye is sensitive but may comprise other forms of radiant energy including those in the invisible portions of the spectrum. Any suitable primary or secondary light source may be employed in the optical system, a secondary source constituted by a diaphragm having an aperture of predetermined contour being shown herein as a preferred embodiment. Other effective light sources may be positioned adjacent the front focal plane of the condenser such as an incandescent filament, a fluorescent tube, a reflecting means, the image of a lamp filament, the image of an aperture, or the image of some other source of radiant energy.

An object of the invention is to provide a relatively simple and efficient optical system for the examination of an object or specimen as, for example, in a microscope, which enables improved alteration of contrast effects in the visible image of the object or specimen;

Another object of the invention is to provide such an optical system wherein the alteration of contrast may be obtained in a gradual and progressive manner.

A further object of the invention is to provide an optical system which is adapted to permit a gradual variation of the phase relation between deviated spectra emanating from a specimen and other reference light rays.

Still another object of the invention is to provide an optical system wherein a gradual variation of the amplitude ratio between deviated and undeviated light rays may be obtained.

A still further object of the invention is to provide an optical system in which portions of direct light from a given light source and other portions of light incident and diffracted by an object are brought to a condition for interference in an image plane.

Another object of the invention is to provide readily operable means for modifying the phase and amplitude ratios between portions of direct light from an effective light source and other portions of light from said light source which are directed upon and diffracted by a specimen.

A further object of the invention is to provide an optical system wherein improved means for achromatization of various wave lengths are included.

Still another object of the invention is to provide an optical system which is capable of producing improved color contrast between various regions of a specimen.

These and other objects of the invention will be apparent from the following description taken in connection with the accompanying drawings, wherein like reference characters refer to like parts throughout the several views and of which drawings:

Figure 1 is a diagrammatic view of an optical system of a microscope operable in accordance with the present invention for gradually modifying the phase and amplitude relation between spectra diffracted by a specimen and light rays which are guided directly to an image plane through an optical path which avoids their interception by the specimen.

Fig. 2 is a front detail view of a component employed in the optical system of Fig. 1;

Fig. 3 is a similar view of another component of the optical system of Fig. 1; and Fig. 4 is a fragmentary diagrammatic view of the optical system of Fig. 1 showing phase-modifying components positioned therein.

The assembly shown in Fig. 1, which illustrates an embodiment of the present invention, constitutes the optical system of a microscope. A diaphragm 12 is positioned at the entrance pupil of the system for admitting light from a suitable light source (not shown), and thus serves as a secondary light source. A diaphragm, such as that shown in Figs. 1 and 2, has an annular light aperture $a$ formed therein and opaque portions $b$, contiguous therewith, light emergent from the aperture being controlled as to contour. For purposes of illustration, a bundle of light rays L from but a single point of aperture $a$ is shown, it being understood that a plurality of such bundles will be admitted from various points throughout aperture $a$. A converging lens 14 for rendering the light rays substantially parallel is preferably positioned adjacent diaphragm 12. Parallelism of the light rays is not an essential condition, however.

A semi-reflecting element or beam-splitter 16 is mounted adjacent lens 14 for intercepting light rays transmitted by the latter. Element 16 divides the light rays into two optical paths whereby one portion of the rays $L_1$, shown by dashed lines, is transmitted, without change of direction, to completely-reflecting mirror 18, and the other portion of the rays $L_2$, shown by solid lines, is diverted angularly to completely-reflecting mirror 20. It will be noted in Fig. 1 that mirrors 16, 18 and 20 are positioned at 45° relative to the optical axes of the optical paths but any angles of inclination thereof for suitably directing the light rays may be employed.

The light rays $L_1$ are directed upon a slide 22 having a transparent specimen mounted thereupon, a single particle 24, only, of the specimen being shown in exaggerated form in a surrounding medium 26 for purposes of illustration. It may be assumed, for example, that the particle and surround are of different thicknesses and that they may also have different refractive indices so that the optical path of each region for light passing therethrough differs from the other. One portion of the intercepted spectra $L_1$ is diffracted or deviated by the particle and is represented by dotted lines $L_3$. The other portion of the spectra $L_1$ passes through the specimen as undeviated rays.

An objective 28, which may suitably comprise components 30, 32, and 34 of the general form shown, is positioned adjacent the slide 22. A plate- or disc-like element 36 for intercepting both the undeviated rays $L_1$ and the diffracted or deviated rays $L_3$ is positioned adjacent the back focal plane of objective 28. Element 36 is preferably geometrically similar in contour to diaphragm 12 but has relatively transverse light-transmitting and opaque portions which are reversely located with respect to light-transmitting and opaque portions of diaphragm 12. Thus annular portion or zone $a'$ of element 36, which is conjugate to annular aperture $a$ of the diaphragm, is opaque, and complementary portions forming zone $b'$ are transparent. The diffracted spectra $L_3$ is incident transparent complementary zone $b'$ and is transmitted thereby. The undeviated light rays $L_1$, forming an image of the light from the clear annulus $a$ of diaphragm 12, are incident the opaque conjugate zone $a'$ of element 36. However, the latter rays are blocked (i. e. absorbed or reflected) by said zone and, accordingly, serve no further function in the system. Element 36 may thus be termed a light filter or selector which is adapted to selectively transmit or block incident light.

Referring to the second optical path along which the rays $L_2$ are transmitted, said rays are directed by completely-reflecting mirror 20 to objective 38 comprising components 40, 42 and 44. Objective 38 may appropriately be a counterpart of the aforesaid objective 28 and transmit light rays $L_2$ to form an image of annulus $a$ of diaphragm 12 upon the reverse side of conjugate zone $a'$ of element 36. Said reverse side of conjugate zone $a'$ is provided with a reflecting surface and the image formed thereat would substantially coincide, point for point, with an image of the undeviated spectra $L_1$, if the latter were not blocked by opaque portions $a'$.

Thus, it will be seen that the light rays $L_1$ traversing the first optical path are utilized only in the form of diffracted spectra (namely, spectra diffracted by the particle 24) and that the light rays $L_2$ traversing the second optical path are employed in their original form, as direct rays. From selector element 36, the diffracted spectra $L_3$ is brought to a focus at an image plane 46, such as the field of an eyepiece (not shown), to form a geometrical image of particle 24. An overlapping portion of the direct light rays $L_2$, reflected from said reflecting surface of conjugate zone $a'$ of selector 36, is combined with the diffracted spectra, as shown, to provide a desired interference of $L_2$ and $L_3$ and, accordingly, a desired brightness or darkness of the image of the particle with respect to the background as will presently be described. Other portions of the direct light rays $L_2$ are spread over the image plane, as illustrated, to provide background illumination.

In the optical system of Fig. 1, the normal arrangement of components is such that the distances traversed by the direct rays $L_1$ and $L_2$ along their respective optical paths from diaphragm 12 to light selector element 36 is substantially identical, said basic arrangement being a preferred condition. The relative angular inclination of diaphragm 12 and selector element 36 provide a similar path length for light rays extending therebetween. To insure a similarity of said optical paths, mirrors 16 and 18 preferably have rear reflecting surfaces and mirror 20 has a front reflecting surface. It will also be understood that specimen mounting plates are considered as to thickness in the optical system. In the example shown, the diffracted or deviated spectra $L_3$ is retarded in phase with respect to the direct light rays $L_2$ owing to the greater optical path which the particle 24 presents to said spectra $L_3$. The phase of the direct light rays $L_2$ may readily be altered to provide destructive or reinforcing interference with said retarded spectra $L_3$ by any of a plurality of available means as, for example, by altering the interrelation of components of the system to affect their spacing. Thus, mirror 20 may be moved horizontally and rotated, as indicated by arrows 48 and 50, while mirror 16 is rotated, as indicated by arrow 52 to vary the path length of $L_2$ with respect to that of $L_1$, it being understood that suitable slidable and pivotal mounting means for accomplishing said movements of the components are provided in the instrument. Thus to increase the path length of $L_2$ mirror 20 would be moved toward the left and said mirror as well as mirror 16 would be rotated in a counterclockwise direction. An interlocking mechanism could be employed for accomplishing said movements through a single actuating number.

The relative amplitude of the diffracted spectra $L_3$ and the direct light rays $L_2$ may be altered either with or without accompanying relative phase modification, as desired, by introducing suitable means for the purpose in one or both of the optical paths of rays $L_1$ and $L_2$. Said means, represented by components 54 and 56, which are movable in directions indicated by arrows 58 and 60, may, for example, be composed of glass plates having a thin metallic coating such as one of aluminum, plutonium, rhodium or the like deposited thereon. Movement of element 54 into the path of light rays $L_2$ will provide a reduction in brightness of the background light, and movement of element 56 into the path of light rays $L_1$ will result in a diminution of brightness of the image of the particle. For obtaining a gradual alteration of the amplitude ratio between $L_3$ and $L_2$, variably light-absorbing elements such as a pair of relatively rotatable superposed light-polarizers may be positioned in either or both of the optical paths. Other means for gradually varying the amplitude could be in the form of metallic light-transmitting wedges of a metal such as that mentioned relative to elements 54 and 56. Such components as color filters, or polarizing accessories to produce color differences or polarization differences between the direct and diffracted light rays may also be introduced into the arms of the instrument. Where an amplitude modifying component is inserted in but one of the arms of the instrument it will be understood that it is either of such thickness and refractive index as not to appreciably affect the phase relation of light rays $L_1$ and $L_2$ or that a compensating element is positioned in the other arm. Other phase-modifying devices may be introduced into either or both of the optical paths of $L_1$ and $L_2$ in place of the adjustable mounting for mirrors 16 and 20 and indeed may be preferred for the purpose. For stepwise variation of phase, a series of transparent plates having, for example, a dielectric such as magnesium fluoride deposited thereon, may be mounted for slidable or other movement into one or both of the paths of light. Another method contemplates the use of identical pairs of glass plates 58 and 60 (Fig. 4) in both optical paths, one pair being fixed and the other being tiltable as indicated by the arrows 62. By tilting plates 58, for example, a greater or lesser thickness of glass will be presented to the rays $L_2$ thus gradually varying the optical path. Plates 58 provide zero relative retardation in the two optical paths when they are at a similar angular position to that of plates 60. Other means for gradually modifying the phase relation of the undeviated and deviated light could be in the form of optical wedges positioned in each arm of the system.

Selector 36 may be differently formed and image plane 46 repositioned for accomplishing a substantially similar result to that above described. For example, conjugate zone $a'$ may be a clear light transmitting area and complementary zones $b'$ may have reflecting surfaces facing objective 28. Image plane 46 would then be positioned to the right of selector 46 along an extension of the lateral optical axis of $L_2$ at a distance from the selector similar to that shown. With said constructions, deviated light rays $L_3$ would be reflected to the repositioned image plane; undeviated light rays $L_1$ would be transmitted through the clear zone $a'$ and could then be eliminated by a suitable absorbing material, and direct light rays $L_2$ would be transmitted through the clear zone $a'$ to the repositioned image plane. Accordingly, the deviated light rays $L_3$ and the direct light rays $L_2$ would be caused to overlap and interfere while forming an image on the repositioned image plane 46.

Where the source of light is other than monochromatic as, for example, where "white" light is utilized, means may be employed to insure a path difference between the undeviated and deviated light which is constant for all wave lengths and so to provide achromatization. Accordingly, optimum contrast for all wave lengths of the spectrum will be provided and the introduction of color in the image may be avoided. The optical system of the present invention is particularly adapted to such a purpose inasmuch as each arm of the instrument permits the unrestricted positioning of suitable achromatizing elements therein.

It may be desired, for example, to modify the phase difference between the reference wave front or direct light rays L₂ (Fig. 1) and the diffracted wave front or deviated light rays L₃ by a given fraction of a wave length for red and blue light. In the following example, said fraction of a wave length is ¼ λ for wave lengths 6563 Å. and 4861 Å. The two paths or arms of the instrument are adjusted to be of equal length and are thus maintained. Plane parallel glass plates, represented by plates 64 and 66, of suitable relative thickness and composition are positioned in each arm of the instrument so as to intercept light rays L₂ and L₃, respectively. The proper thickness and type of glass of the plates may be determined as follows, wherein P₁ designates plate 64 and P₂ designates plate 66.

$t_1$ = thickness of plate $P_1$.
$t_2$ = thickness of plate $P_2$.
$n_{1F}$ = refractive index of $P_1$ for $\lambda = 4861$ Å.
$n_{2F}$ = refractive index of $P_2$ for $\lambda = 4861$ Å.
$n_{1C}$ = refractive index of $P_1$ for $\lambda = 6563$ Å.
$n_{2C}$ = refractive index of $P_2$ for $\lambda = 6563$ Å.

Then:

$$t_1(n_{1F}-1) - t_2(n_{2F}-1) = \frac{\lambda F}{4} = 0.0001215 \text{ mm.}$$

$$t_1(n_{1C}-1) - t_2(n_{2C}-1) = \frac{\lambda C}{4} = 0.0001641 \text{ mm.}$$

For Bausch and Lomb glass LBC −2:
$n_C = 1.56956$; $n_D = 1.57250$; $n_F = 1.57953$.
For Bausch and Lomb glass DBC −3:
$n_C = 1.60773$; $n_D = 1.61088$; $n_F = 1.61841$.
$n_1$ refers to LBC −2 glass.
$n_2$ refers to DBC −3 glass.
Solving the above equations,
$t_1 = 1.159837$ mm.
$t_2 = 1.086721$ mm.

Using the above-mentioned glasses it is found that the phase difference for light of intermediate wavelength, namely 5893 Å., i. e. the D line of sodium, is:

$$t_1(n_{1D}-1) - t_2(n_{2D}-1) = 0.2555\lambda D$$

Thus, a substantially perfect achromatization for three wavelengths, blue (F), red (C), and yellow (D) is obtained.

Constructions of the present invention are similarly well adapted to the insertion in each of the arms of the instrument of plate-like phase modifying elements (also represented by elements 64 and 66 of Fig. 1) for obtaining a relatively bright region of a specimen in a given color and, simultaneously, a relatively dark region in a contrasting color. This method permits determining optical paths of the specimen by noting the color of light emanating from different regions thereof.

For example, it may be desired to provide a $+¼\lambda$ path difference for blue light and $-¼\lambda$ for red light. Using the same terminology and constants as in the above-described achromatization method:

$$t_1(n_{1F}-1) - t_2(n'_{2F}-1) = \frac{\lambda F}{4}$$

$$t_1(n_{1C}-1) - t_2(n_2-1) = -\frac{\lambda C}{4}$$

$t_1 = 7.356334$ mm., glass LBC −2
$t_2 = 6.894031$ mm., glass DBC −3
$t_1(n_{1D}-1) - t_2(n_{2D}-1) = 0.128\lambda D$ Thus, plus contrast for the blue light (F), minus contrast for the red light (C), and slightly plus contrast for the yellow light (D) is obtained.

To obtain substantially a reversal of the above-described color contrast effects the same glass plates are employed, but interchanged in the two arms of the instrument.

Then:

$$t_1(n_{1F}-1) - t_2(n_{2F}-1) = -\frac{\lambda F}{4}$$

$$t_1(n_{1C}-1) - t_2(n_{2C}-1) = \frac{\lambda C}{4}$$

$t_1 = 6.894031$ mm., glass DBC −3
$t_2 = 7.356334$ mm., glass LBC −2

It will be understood that various other modifications of the constructions and relative positioning of components may be made in accordance with the general principles exemplified herein. For example, by the employment of a greater or lesser number of reflecting surfaces than those shown, the direction of the divided rays may be varied considerably, the angles at which diaphragm 12 and light selector 36 are positioned may, accordingly, be altered, and the image plane 46 may be repositioned. Many advantages have been described which are attendant upon the splitting of the direct rays into two optical paths so that the phase and amplitude relationships of diffracted and nondiffracted spectra may readily be modified. Other advantages accruing to division of the rays, and specific means for accomplishing the same, will readily be apparent and are considered to be within the province of the present invention. Accordingly, such examples as are described herein are merely illustrative and the invention may be otherwise embodied and practiced within the scope of the following claims.

I claim:

1. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays transmitted by said condenser means and to direct same along separate first and second optical paths respectively, objective means positioned in each optical path and each objective means cooperating with said condenser means so as to form an image of light rays received from said light source, reflecting means positioned in each of said optical paths for directing said image forming light rays toward a common predetermined intersection and forming light source images which substantially coincide substantially at said intersection, an object plane in one of said optical paths adjacent the objective means thereof, said last mentioned objective means having a conjugate image plane, relatively thin plate-like selector means positioned substantially at said intersection and comprising a plurality of differently formed portions, one of said portions being of such predetermined optical properties, contour and transverse dimensions relative to said light source images and so positioned relative thereto as to prevent the transmission of said image forming light rays of the optical path containing said object plane while light rays of said last mentioned path which are deviated by an object when positioned at said object plane are transmitted through another of said portions, said one portion being of such properties as to reflect the image forming light rays of the other optical path as undeviated light rays toward said conjugate image plane, and means positioned in one of said optical paths for modifying one of the phase and amplitude differences existing between the deviated and undeviated light rays directed toward said conjugate image plane, to thereby alter contrast effects in an image of said object.

2. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays from said condenser means and to direct said rays along separate first and second optical paths respectively, reflecting means positioned in each of said optical paths for directing the light rays thereof toward a common predetermined intersection, an object plane for locating an object to be observed in the first of said optical paths, objective means positioned in each of said optical paths and each objective means cooperating with said condenser means so as to form an image of the light rays received from said light source substantially at said intersection, relatively thin plate-like selector means positioned substantially at said intersection and having an opaque portion of such size and shape as to eliminate the undeviated spectra and a transparent portion for transmitting the deviated spectra emanating from an object in said first optical path and positioned substantially at said object plane, so that only the deviated spectra is permitted to reach a conjugate image plane of said objective means in said first optical path, said opaque portion having reflective properties so as to direct light rays which have been transmitted along the second of said optical paths toward said conjugate image plane, whereby said deviated spectra and said light rays of said second optical path are caused to overlap adjacent said conjugate image plane, and light absorbing means positioned in one of said optical paths for varying the amplitude of the light rays transversing the same relative to the amplitude of the light rays of the other optical path to provide an alteration of contrast effects in an image of said object.

3. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays from said condenser means and to direct said rays along separate first and second optical paths respectively, reflecting means positioned in each of said optical paths for directing the light rays thereof toward a common predetermined intersection, an object plane for locating an object to be observed in the first of said optical paths, objective means positioned in each of said optical paths and each objective means cooperating with said condenser means so as to form an image of the light rays received from said light source substantially at said intersection, relatively thin plate-like selector means positioned substantially at said intersection and having an opaque portion of such size and shape as to eliminate the undeviated spectra and a transparent portion for transmitting the deviated spectra emanating from an object in said first optical path and positioned substantially at said object plane, so that only the deviated spectra is permitted to reach a conjugate image plane of said objective means in said first optical path, said opaque portion having reflective characteristics so as to direct light rays being transmitted along the second of said optical paths toward said conjugate image plane, whereby said deviated spectra and said light rays of said second optical path are caused to overlap adjacent said conjugate image plane, and light retarding means positioned in one of said optical paths for varying the phase of the light rays traversing the same relative to the phase of the light rays of the other optical path to thereby provide an alteration of contrast effects in an image of said object.

4. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays transmitted by said condenser means and to direct said rays along separate first and second optical paths respectively, reflecting means positioned in each of said optical paths for directing the light rays thereof toward a common predetermined intersection, an object plane for locating an object to be examined in the first of said optical paths, objective means positioned in each of said optical paths and each objective means cooperating with said condenser means so as to form an image of said light source substantially at said intersection, relatively thin plate-like selector means positioned substantially at said intersection and having a substantially opaque area of a contour substantially similar to the contour of said light source and of such size and so positioned at said intersection as to eliminate substantially all of the undeviated spectra and a transparent portion to transmit at least a large portion of the deviated spectra emanating from an object in said first optical path and disposed at said object plane, whereby only the deviated spectra is permitted to reach a conjugate image plane of said objective means in said first optical path, said opaque portion having reflective characteristics so as to direct light rays being transmitted along the second of said optical paths toward said conjugate image plane thereby causing said deviated spectra and direct light rays from said second optical path to overlap at said conjugate image plane, light absorbing means adjustably mounted in one of said optical paths for varying the amplitude of light rays traversing the same, and light retarding means adjustably mounted in one of said optical paths for varying the phase of the light rays traversing the same, said adjustable phase and amplitude varying means when actuated providing alteration of contrast effects in an image of said object at said conjugate image plane.

5. A phase contrast optical system for providing alteration of contrast effects in the image of an object under observation, said optical system comprising diaphragm means obliquely intersecting optical axis of said system adjacent an entrance pupil thereof, said diaphragm means having a light aperture of predetermined dimensions and contour, condenser means optically aligned with and positioned adjacent said light source, semi-reflecting means for dividing the light rays from said condenser means and directing said divided light rays along separate first and second optical paths respectively, reflecting means positioned in each of said optical paths for directing the light rays thereof toward a predetermined intersection common to both of said optical paths, an object plane for locating an object to be observed in the first of said optical paths, objective means positioned in each of said optical paths and each objective means cooperating with said condenser means so as to form an image of the light rays received from said light aperture substantially at said intersection, relatively thin plate-like selector means obliquely intersecting each of said optical paths at an angle similar to the oblique angle of said diaphragm means, said selector means comprising a plurality of areas one of which is substantially opaque and of a contour similar to the contour of said light aperture and of such size and so positioned as to eliminate the undeviated spectra while another area thereof transmits the deviated spectra emanating from an object positioned at said object plane, so that only the deviated spectra is permitted to reach a conjugate image plane of said objective means in said first optical path, said opaque portion having reflective characteristics so as to direct light rays being transmitted along the second of said optical paths toward said conjugate image plane, to thereby cause said deviated spectra and direct light rays from said second optical path to overlap adjacent said conjugate image plane, and means positioned in one of said optical paths for varying one of the phase and amplitude differences of the light rays reaching the conjugate image plane for alteration of contrast effects in an image of said object.

6. A phase contrast optical system for providing alteration of contrast effects in the image of an object under observation, said optical system comprising means providing a light source of predetermined dimensions and contour positioned adjacent an entrance pupil of said system, condenser means positioned adjacent and aligned with said light source, beam-splitting means for dividing the light rays transmitted by said condenser means and directing said divided rays along separate first and second optical paths respectively, said first optical path including an object plane at a predetermined location therein, reflecting means positioned in each of said optical paths for directing light rays thereof toward a common predetermined intersection, objective means located in each of said optical paths and each objective means cooperating with said condenser means so as to form substantially coinciding images of said light source substantially at said intersection, relatively thin plate-like selector means positioned substantially at said intersection and comprising a plurality of differently formed zonal portions extending transversely of both of said optical paths, one of said zonal portions being substantially opaque and of such size and shape and so positioned as to substantially coincide with the images of said light source at said intersection, so as to eliminate undeviated light rays traversing an object when at said object plane, said selector means having another of said zonal portions transmitting light rays deviated by said object at said object plane and directed by the objective adjacent thereto toward a conjugate image plane, said substantially opaque zonal portion of said selector means reflecting image forming light rays of said second optical path toward said conjugate image plane, and adjustable means in one of said optical paths for gradually modifying one of the phase and amplitude differences between said deviated and image forming light rays passing beyond said selector means and toward said conjugate image plane to alter the contrast effects in an image of said object at said conjugate image plane.

7. A phase contrast optical system for providing alteration of contrast effects in an image of an object under observation, said optical system comprising means providing a light source of predetermined dimensions and contour positioned adjacent an entrance pupil of said system, condenser means positioned adjacent and aligned with said light source, semi-reflecting means for dividing the light rays from said condenser means and directing said rays along separate first and second optical paths, reflecting means in each optical path for directing said light rays toward a common predetermined intersection, said first optical path including an object plane, said reflecting means including translationally and pivotally adjustable reflecting means positioned in at least one of said optical paths for directing the light rays thereof toward said predetermined intersection, objective means located in each of said paths and each objective means cooperating with said condenser means so as to form substantially coinciding images of said light source substantially at said predetermined intersection, and plate-like selector means positioned substantially at said predetermined intersection and comprising a plurality of differently formed zonal portions extending traversely of both optical paths, one of said zonal portions being substantially opaque and of such size and shape and so positioned as to coincide with the images of said light source at said intersection, so as to eliminate undeviated light rays traversing an object when at said object plane, said selector means having another of said zonal portions transmitting light rays deviated by said object at said object plane and directed by the objective adjacent thereto toward a conjugate image plane, said substantially opaque zonal portion of said selector means reflecting the image forming light rays of said second optical path toward said conjugate image plane, translational and pivotal adjustment of said adjustable reflecting means serving to vary the length of one of said optical paths relative to the other and thus to vary the phase relation between said deviated and image forming light rays passing beyond said selector means and toward said conjugate image plane and, accordingly, altering contrast effects in an image of said object at said conjugate image plane.

8. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays from said condenser means and to direct said rays along separate first and second optical paths respectively, reflecting means positioned in each of said optical paths for directing the light rays thereof toward a common predetermined intersection, an object plane for locating an object to be observed in the first of said optical paths, objective means positioned in each of said optical paths and each objective means cooperating with said condenser means so as to form an image of said light source substantially at said intersection, relatively thin plate-like selector means positioned substantially at said intersection and comprising an opaque portion of substantially the size and shape of said light source images and in substantial coincidence therewith for eliminating the undeviated spectra traversing said object plane and a transparent portion for transmitting the deviated spectra emanating from an object when disposed in said first optical path and positioned substantially at said object plane, so that only said deviated spectra is permitted to reach a conjugate image plane of said objective means in said first optical path, said opaque portion having reflective characteristics so as to direct light rays transmitted along the second of said optical paths toward said conjugate image plane, thereby causing said deviated spectra and the light rays of said second optical path to overlap adjacent said conjugate image plane, and means comprising light-retarding plates of predetermined thickness and refractive index positioned in each of said optical paths, one of said plates being pivotally mounted relative to its optical path for gradually varying the effective thickness and accordingly the optical path length of the light rays passing therethrough to gradually vary the phase difference existing between said deviated and light rays of said second optical path traveling toward said conjugate image plane and, accordingly, altering contrast effects in an image of said object at said conjugate image plane.

9. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays transmitted by said condenser means and to direct same along separate first and second optical paths respectively, objective means positioned in each optical path and each objective means cooperating with said condenser means so as to form an image of light rays received from said light source, reflecting means positioned in each of said optical paths for directing said image forming light rays toward a common predetermined intersection and forming light source images which substantially coincide substantially at said intersection, an object plane in one of said optical paths adjacent the objective means thereof, said last mentioned objective means having a conjugate image plane, relatively thin plate-like selector means positioned substantially at said intersection and comprising a plurality of differently formed portions, one of said portions being of such predetermined optical properties, contour and transverse dimensions relative to said light source images and so positioned relative thereto as to prevent the transmission of said image forming light rays of the optical path containing said object plane while light rays of said last mentioned path which are deviated by an object when positioned at said object plane are transmitted through another of said portions, said one portion being of such properties as to reflect the image forming light rays of the other optical path as undeviated light rays toward said conjugate image plane, and means comprising a pair of relatively rotatable light-polarizing elements positioned in one of said optical paths for gradually modifying the amplitude of light rays thereof traveling toward said conjugate image plane and, accordingly, for varying contrast effects in an image of said object at said conjugate image plane.

10. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays from said condenser means and to direct said rays along separate first and second optical paths respectively, reflecting means positioned in each of said optical paths for directing the light rays thereof toward a common predetermined intersection, an object plane for locating an object to be observed in the first of said optical paths, objective means positioned in each of said optical paths and each objective means cooperating with said condenser means so as to form an image of the light rays received from said light source substantially at said intersection, relatively thin plate-like selector means positioned substantially at said intersection and comprising an opaque portion of substantially the size and shape of said light source image and in substantial coincidence therewith for eliminating the undeviated spectra traversing said object plane and a transparent portion for transmitting the deviated spectra emanating from an object when disposed in said first optical path and positioned substantially at said object plane, so that only said deviated spectra is permitted to reach a conjugate image plane of said objective means in said first optical path, said opaque portion having reflective characteristics so as to direct light rays transmitted along the second of said optical paths toward said conjugate image plane, thereby causing said deviated spectra and the light rays from said second optical path to overlap adjacent said conjugate image plane, and means comprising a pair of cooperating relatively slidable optical wedges positioned in one of said optical paths for modifying the phase relation between said deviated and the light rays from said second optical path traveling toward said conjugate image plane and, accordingly, for altering contrast effects in an image of said object at said conjugate image plane.

11. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays transmitted by said condenser means and to direct said rays along separate first and second optical paths respectively, reflecting means positioned in each of said optical paths for directing the light rays thereof toward a common predetermined intersection, an object plane for locating an object to be examined in the first of said optical paths, objective means positioned in each of said optical paths and each objective means cooperating with said condenser means so as to form an image of said light source substantially at said intersection, relatively thin plate-like selector means positioned substantially at said intersection and having a substantially opaque area of a contour substantially similar to the contour of said light source and of such size and so positioned at said intersection as to eliminate substantially all of the undeviated spectra and a transparent portion to transmit at least a large portion of the deviated spectra emanating from an object in said first optical path and disposed at said object plane, whereby only the deviated spectra is permitted to reach a conjugate image plane of said objective means in said first optical path, said opaque portion having reflective characteristics so as to direct light rays being transmitted along the second of said optical paths toward said conjugate image plane thereby causing said deviated spectra and direct light rays from said second optical path to overlap at said conjugate image plane, means comprising a pair of plane parallel light-transmitting plates of predetermined relative thicknesses and refractive indices, one of said plates being positioned in each of said optical paths, said plates having predetermined optical properties so as to provide an optical path difference between said two optical paths which is constant for substantially all wave lengths of the spectrum for achromatization purposes, and means in one of said optical paths for modifying one of said phase and amplitude differences existing between said deviated and direct light rays traveling toward said conjugate image plane, to thereby alter contrast effects in an image of said object at said conjugate image plane.

12. A phase contrast optical system for providing alteration of contrast effects in the image of an object under observation, said optical system comprising means providing a light source of predetermined dimensions and contour positioned adjacent an entrance pupil of said system, condenser means optically aligned with and positioned adjacent said light source, semi-reflecting means positioned so as to intercept and divide the light rays transmitted by said condenser means and to direct same along separate first and second optical paths respectively, objective means positioned in each optical path and each objective means cooperating with said condenser means so as to form an image of light rays received from said light source, reflecting means positioned in each of said optical paths for directing said image forming light rays toward a common predetermined intersection and forming light source images which substantially coincide substantially at said intersection, an object plane in one of said optical paths adjacent the objective thereof, said last mentioned objective means having a conjugate image plane, relatively thin plate-like selector means positioned substantially at said intersection and comprising a plurality of differently formed portions, one of said portions being of such predetermined optical properties, contour and transverse dimensions relative to said light source images and so positioned relative thereto as to prevent the transmission of said image forming light rays of the optical path containing said object plane while light rays of said last mentioned path which are deviated by an object when positioned at said object plane are transmitted through another of said portions, said one portion being of such properties as to reflect the image forming light rays of the other optical path as direct light rays toward said conjugate image plane, means comprising a color filter in one of said optical paths for modifying the color of light rays traversing same, and means in one of said optical paths for modifying one of said phase and amplitude differences existing between said deviated and direct light rays traveling toward said conjugate image plane, to thereby alter contrast effects in an image of said object at said conjugate image plane.

ALVA H. BENNETT.

References Cited in the file of this patent

UNITED STATES PATENTS

| Number | Name | Date |
|---|---|---|
| 1,569,342 | Vernes et al. | Jan. 12, 1926 |
| 2,045,124 | Cummins et al. | June 23, 1936 |
| 2,516,905 | Osterberg et al. | Aug. 1, 1950 |

FOREIGN PATENTS

| Number | Country | Date |
|---|---|---|
| 636,168 | Germany | Oct. 7, 1936 |

OTHER REFERENCES

Osterberg, "The Polanret Microscope," article in Journal of the Optical Society of America, September 1947, vol. 37, pages 726 to 729 inc.; published by American Institute of Physics, New York. (Copy in Division 7, Patent Office.)